United States Patent [19]

Paruso et al.

[11] 4,244,986
[45] Jan. 13, 1981

[54] METHOD OF FORMING SODIUM BETA-AL$_2$O$_3$ FILMS AND COATINGS

[75] Inventors: Deborah M. Paruso, Pittsburgh; Bulent E. Yoldas, Churchill, both of Pa.

[73] Assignee: Westinghouse Electric Corp., Pittsburgh, Pa.

[21] Appl. No.: 32,796

[22] Filed: Apr. 24, 1979

[51] Int. Cl.$^3$ .................. B05D 5/12; H01M 4/36
[52] U.S. Cl. ................. 427/126.4; 427/376.3; 427/383.3; 429/104; 429/193; 423/600; 252/313 R
[58] Field of Search ............... 427/126, 226, 376 B, 427/383 R, 383 A; 429/193, 191, 104; 423/600, 630; 528/395; 260/448 AD; 252/313 R

[56] References Cited

U.S. PATENT DOCUMENTS

| | | | |
|---|---|---|---|
| 2,400,709 | 5/1946 | Patrick | 252/313 R |
| 2,656,321 | 10/1953 | Hunter et al. | 252/313 R |
| 2,686,159 | 8/1954 | Webb et al. | 252/313 R |
| 2,903,418 | 9/1959 | Kirshenbaum et al. | 252/313 R |
| 3,901,733 | 8/1975 | Toy et al. | 136/153 |
| 3,946,102 | 3/1976 | Thomas | 423/600 |
| 3,959,022 | 5/1976 | DeJonghe et al. | 264/66 |
| 4,041,215 | 8/1977 | Kormanyos et al. | 429/193 |
| 4,082,826 | 4/1978 | Iijima | 264/65 |

Primary Examiner—Ronald H. Smith
Assistant Examiner—Richard Bueker
Attorney, Agent, or Firm—D. P. Cillo

[57] ABSTRACT

A sodium Beta-alumina thin film is coated onto a supporting substrate by forming an agglomerate-free, hydrolyzed sol, principally comprising an electrically surface active polymer formed by the hydrolysis and peptization of sodium and aluminum alkoxides, which is applied to the substrate. The substrate and applied sol are then heated to crystallize the polymer and form a solid film having pores with radii of up to about 250 Angstrom units.

13 Claims, 1 Drawing Figure

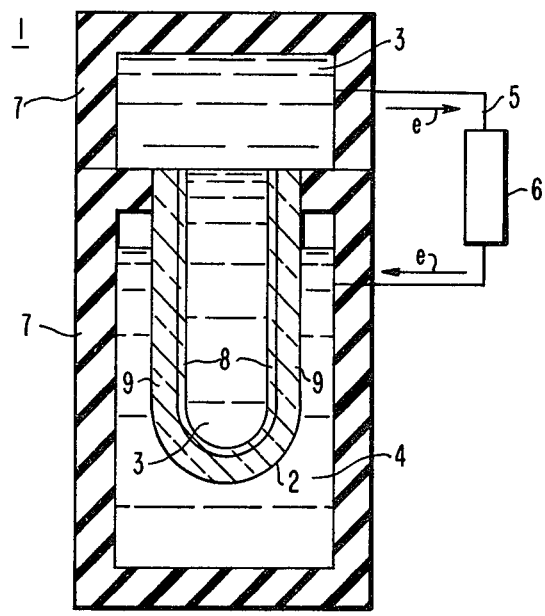

METHOD OF FORMING SODIUM BETA-$AL_2O_3$ FILMS AND COATINGS

GOVERNMENT CONTRACT

The Government has rights in this invention pursuant to Contract No. DAAG-29-77-C-0029 awarded by the Department of the Army.

BACKGROUND OF THE INVENTION

Beta-alumina was first reported by Rankin and Merwin in 1916. However, extensive research on this material did not take place until fifty years later, when its use as a solid electrolyte for the sodium-sulfur battery was investigated. Sodium Beta-alumina exhibits the unique property of having a high sodium ion conductivity at 300° C., which is the temperature at which the sodium-sulfur battery is operated.

Sodium Beta-alumina is a highly ion-conductive ceramic which can be represented by the chemical formula: $Na_2O.xAl_2O_3$, where x can vary between 5 and 11. Sodium Beta-alumina powder is generally produced by reaction fusion of $Al_2O_3$ powder with $Na_2O$ in the form of a sodium salt, at 1250° C. to 1500° C., to form $Na_2O.xAl_2O_3$, as described by Iijima, in U.S. Pat. No. 4,082,826. The sodium Beta-alumina powder is then formed into the desired electrolyte shape, and sintered at up to 1750° C. DeJonghe et al., in U.S. Pat. No. 3,959,022, reduced sintering temperatures by first forming a eutectic mixture of sodium-aluminum oxide, in which the atom ratio of sodium to aluminum is 0.54. This eutectic mixture is added to sodium Beta-alumina powder and the additive mixture is heated at about 1600° C., to achieve reactive liquid phase sintering.

The grain size, purity and porosity of sodium Beta-alumina are extremely important factors influencing its ion conductivity and performance as a solid electrolyte. The high temperature fusion method of formation, where Al and Na are reacted in the solid state at from 1250° C. to about 1550° C., generally entails undesirable grain growth and purity problems, and requires sintering at up to 1800° C., further increasing grain growth, which increases porosity.

In addition, bulk sodium Beta-alumina does not have very good thermal or electrical shock resistance, and cannot be formed easily into thin sections. When formed into a solid electrolyte for battery applications, fracturing due to mechanical or thermal shock is possible, allowing contact of molten sulfur and molten sodium with catastrophic results. Such thick solid electrolytes, made solely of thick sodium Beta-alumina, will also exhibit high electrical resistance. What is needed is a method of making thin, continuous, and essentially impermeable films of sodium Beta-alumina, which could be coated onto suitable high strength supporting substrates. Such a thin film system could still provide a $Na^+$ conductive barrier between molten sodium and molten sulfur in a battery electrolyte, and could also have excellent resistance against mechanical failure.

To this end, Toy et al, in U.S. Pat. No. 3,901,733, formed 50 to 1000 micron thick, Beta-alumina barrier layer films on polyaluminate support sheets, where leakage of molten sodium was controlled by film thickness. The film was applied by either high temperature plasma arc spraying, radio frequency ion sputtering, chemical vapor deposition, pressing a layer of dense Beta-alumina powder onto the support and then sintering at 1500° C. to 1880° C., or spraying a slurry of crystalline Beta-alumina powder having a neutral surface charge onto the support and then sintering at 1500° C. to 1800° C. Such a method still uses crystalline particulate application techniques in some form, and either requires expensive and sophisticated high temperature application means, or final sintering at between 1500° C. and 1800° C., increasing energy consumption and requiring expensive furnaces.

Films of even 50 micron thickness, however, tend to separate from the support under high temperature cycling stress, and would still provide a high electrical resistivity. What is needed is a simplified method of forming continuous sodium Beta-alumina films at temperatures below 1500° C. The films should have thicknesses of between about 0.005 micron to about 30 microns, and require no high temperature sintering. The pore size of the film should be such that no non-ionic sodium permeation can occur, even though the film is below 30 microns thick. The method should provide films of low porosity having decreased total electrical resistivity.

SUMMARY OF THE INVENTION

The above problems are solved and the above need is met by forming a thin electrolyte film of sodium Beta-alumina on a supporting ceramic body by a process including the following sodium and aluminum alkoxide hydrolyzing, mixing, peptizing and heating steps: (A) forming a sodium Beta-alumina precursor sol, having an Al concentration equivalent to between about 0.5 and about 2.5 weight percent $Al_2O_3$, by hydrolyzing and acid peptizing Na(OR) and Al(OR)$_3$ alkoxide compounds, where R is an alkyl group containing from 1 to 6 carbon atoms, in a manner such that a Na compound is reacted with an Al compound to form a slurry of electrically surface active polymers containing Na, Al, OR, and OH groups, where the peptizing acid is adsorbed on the polymer surface to provide a homogeneous, agglomerate-free, fluid sol, (B) applying the precursor sol as a film to a substrate, and then (C) heating the sodium Beta-alumina precursor film at between 1200° C. and about 1450° C., to cause a phase change and formation of a uniform, low porosity solid material comprising crystalline sodium Beta-alumina in film form firmly bonded to the substrate; where the solid film has pores with radii of up to about 250 Angstrom units, and where the Na and Al compounds are added in step (A) in an amount effective to provide a mole ratio of Na:Al of from 1:5 to 11 in the final crystalline film after heating. An effective amount of a heat stabilizer may optionally be added on step (A).

BRIEF DESCRIPTION OF THE DRAWING

For a better understanding of the invention, reference may be made to the preferred embodiments, exemplary of the invention, shown in the accompanying drawing, which is a schematic diagram of one embodiment of a sodium-sulfur battery employing the supported, thin film sodium Beta-alumina solid electrolyte of this invention.

DESCRIPTION OF THE PREFERRED EMBODIMENTS

Referring now to FIG. 1 of the drawings, one embodiment of a sodium-sulfur battery 1 is shown. The composite electrolyte tube 2 is disposed between molten sodium 3 (melting point 98° C.) and molten sulfur 4

(melts at 119° C.). The molten sodium is the negative active material, while the molten sulfur (charged) is the positive active material. Electrical connections 5, load 6 and thermal insulation 7 are also shown. The tube 2, in the embodiment shown, comprises a thin film 8 of crystalline sodium Beta-alumina having a low porosity, supported by a heat resistant, strong, highly porous ceramic substrate 9. Molten sulfur 4 will permeate the ceramic base 9 to the barrier solid electrolyte film 8. Neither molten sulfur nor molten sodium will permeate film 8. The electrolyte film could be disposed on the outside of the support if desired, in which case molten sodium will permeate the ceramic base 9 to the barrier film 8. In either case, the base-ceramic substrate will be very porous and allow the film direct contact with the molten active materials.

On discharge, at about a 300° C. operating temperature, sodium ions pass through the thin film of sodium Beta-alumina solid electrolyte separating the molten liquid active material, where the sodium ions react with the sulfur anions to form sodium polysulfides, which are also liquid at 300° C. The maximum available energy density of this type system is about 300 Wh/kg compared to about 40 Wh/kg for advanced lead-acid systems. Such sodium-sulfur energy systems are compact, and may be useful in advanced vehicle propulsion.

In the method of this invention, a liquid sodium Beta-alumina precursor sol is formed in controlled low temperature reactions involving polymerization of effective amounts of organometallic sodium and aluminum compounds, and peptization to prevent polymer agglomeration which could lead, upon heating, to large crystalline grain size, high crystalline porosity and a particulate rather than a monolithic, continuous film.

In the reactions, a precursor is formed comprising a hydrolyzed, aqueous, agglomerate-free sol, principally made up of reacted sodium alkoxide and aluminum alkoxide, in the form of an electrically active polymer having an added acidic peptizing agent. By "agglomerate-free" is meant, containing substantially no polymer agglomerates, i.e., about 95+% free of agglomerates. The sol will contain a non-crystalline colloidal suspension of very fine reacted alkoxides. The precursor sol can be brushed, low temperature sprayed or applied as by dipping to the outside or the inside of open or closed tubular ceramic supports. The coated support can then be heated to crystallize the precursor and form a solid layer.

In general terms, the sodium Beta-alumina precursor sol is formed by controlled water hydrolysis and acid peptization of Na(OR) and/or Al(OR)$_3$, where R is an alkyl group containing from 1 to 6 carbon atoms, and where there are reactions of alkyl groups of one compound with hydroxyl groups of the other in a manner effective to form a chemical bond between Na and Al through oxygen. Sodium compounds are reacted with aluminum compounds in amounts effective to form a slurry of an electrically active polymer, containing Na, Al, OR, and OH groups, where R is the same as described above and where the Al concentration in the sol is equivalent to up to about 2.5 weight percent Al$_2$O$_3$ to be formed upon heat crystallization, preferably between about 0.5 weight percent to about 2.5 weight percent Al$_2$O$_3$.

This polymer is non-crystalline, and while having no overall charge, has a surface that is electrically active, due to the presence of charged species at the surface. This provides a residual surface charge attractive to acid electrolyte peptizing agents, which can be adsorbed onto the particle surface. The charged species, comprising OH groups, are disposed on the outer polymer surface and easily interactive with the peptizing agent.

In order to prevent condensation and agglomeration of the reacted materials, final hydrolysis is accomplished with, preferably, a water-alcohol solution, accompanied by the essential addition of acid peptizing agent. By "peptizing" is meant, preventing the agglomeration of large particles, and providing a homogeneous, non-agglomerate sol. Peptization involves stabilizing hydrophobic colloidal materials by addition of electrolytes which provide the necessary electric double layer of ionic charges around each particle. The ions of the electrolyte are strongly adsorbed on the particle surfaces. Only acid electrolytes are effective peptizing agents in the reactions of this invention. It is speculated that large positive ions such as Na$^+$ or K$^+$, that might be present in basic electrolytes, act as some sort of barrier layer to the overcharging process, or react with the polymer constituents.

By keeping the Al concentration of the sol at less than about 2.5 equivalent percent Al$_2$O$_3$ by weight, gellation is prevented. For example, if, as in Example 1, 124 grams (0.5 mole) of aluminum sec-butoxide, the source of Al, was to be reacted with 5.82 grams (0.07 mole) of sodium iso-propoxide, the amount of dilution to provide an Al concentration of about 1 equivalent weight percent Al$_2$O$_3$ would be 2550 grams (one mole of Al$_2$O$_3$, which is to be formed upon later heating, containing two Al ions, is equivalent to two moles of Al sec-butoxide, if Al only is considered, and it is assumed that oxygen is available for stoichiometry. Since $\frac{1}{2}$ mole (124 grams) of Al secbutoxide, the Al supplier, contains $\frac{1}{2}$ Al, $\frac{1}{2}$ mole of Al sec-butoxide reactant is the equivalent of $\frac{1}{4}$ mole of Al$_2$O$_3$ to be formed. Where the molecular weight of Al$_2$O$_3$ is 102, then $\frac{1}{4}$ mole=25.5 grams of Al$_2$O$_3$. If the total solution containing $\frac{1}{2}$ mole of Al sec-butoxide weighs 2550 grams, then it is 1% equivalent of Al$_2$O$_3$ by weight.) Useful well-known peptizing agents preferably include, among others, nitric acid, acetic acid, hydrochloric acid, formic acid, trichloroacetic acid, and perchloric acid, among others.

A variety of specific embodiments of liquid Beta-alumina precursor sol formation are set forth in detail below. The fluid precursor can be applied as a film to a flat, curved, or tubular substrate, such as glass or ceramic, and then heated at between 1200° C. and about 1550° C., to cause a phase change and formation of a solid material comprising crystalline sodium Beta-alumina in film form. In the case of glass, the film can be peeled off, after crystallization heating. Useful refractory ceramic type supports include, among others, alpha-alumina ceramic, mullite ceramic (3Al$_2$O$_3$2SiO$_2$), zirconium oxide ceramic, zirconia ceramic, sodium aluminate ceramics, and the like.

In the first specific embodiment of the invention, a first alkoxide selected from sodium alkoxide and aluminum alkoxide can be dissolved in a compatible solvent, preferably an alcohol, such as isopropyl alcohol (b.p. 82.3° C.) or secondary-butyl alcohol (b.p. 99.5° C.), at a concentration up to saturation. The alkoxide or alkoxide solution is then partially hydrolyzed by water, alone or in a solvent, preferably alcohol, mixture at a temperature up to the boiling point of the solvent medium if one is used, but preferably only up to about 80° C., according to either of the reactions set forth below:

$$Al(OR)_3 + yH_2O \rightarrow Al(OR)_{3-y}(OH)_y + \text{alcohols} \quad (1)$$

or $$Na(OR) + xH_2O \rightarrow Na(OR)_{1-x}(OH)_x + \text{alcohols} \quad (1')$$

where R is an alkyl group having from 1 to 6 carbon atoms, y is less than 3 and x is less than 1. The reaction is most preferably conducted at 25° C. to conserve energy. Each R group may be independently selected if desired although they are usually the same. The R group is preferably ethyl, isopropyl or butyl because these alkoxides are commercially available and inexpensive. The preferred sodium alkoxide is sodium isopropoxide ($NaOCH(CH_3)_2$) and the preferred aluminum alkoxide is aluminum sec-butoxide ($Al(OC_4H_9)_3$).

The term "partially hydrolyzed" is herein defined as meaning that the water must be added in an amount that is effective to react with some but not all, i.e., about 30% to about 90% of the alkoxide (OR) groups; otherwise there will be self-condensation. In the hydrolysis of aluminum alkoxides, where precipitation occurs, by adding acids and raising the temperature, the slurry may be peptized to a clear sol. The resultant product must contain from about 10% to about 70% active hydroxyl and alkyl groups that are free for further reaction.

The partially hydrolyzed reaction product, containing active groups is then reacted with a second alkoxide selected from sodium alkoxide and aluminum alkoxide, which can also be dissolved in a compatible second solvent, preferably an alcohol, up to saturation, where the second alkoxide metal ion is not the same as the first alkoxide metal ion. This reaction is carried out at a temperature up to the boiling point of the lowest boiling solvent, but preferably only up to about 80° C. In this and in the prior reaction, the solvent medium is helpful in providing hydrolysis reaction and polymerization homogeneity at the molecular level. The molar amount of Na and Al in the compounds used in this polymerization reaction is such as to provide a mole ratio of Na:Al of from 1:5 to 11 in the final sodium Beta-alumina crystals. An effective amount of added Na to provide a particular crystalline mole ratio may require up to a 40 molar % excess of Na.

The term "effective amount of Na and Al compound" is meant to include such excess amount of Na, to ensure complete reaction upon heating the precursor between 1200° C. to about 1450° C., to reach the required Na:Al mole ratio of 1:5 to 11 in the final heat crystallized sodium Beta-alumina. The precursor polymer may thus contain an excess of Na. This excess of Na will generally be lost during crystallization heating.

In this partial hydrolyis and sodium-aluminum mixing step, the hydroxyl groups of the partially hydrolyzed reaction product react with the alkyl groups of the second alkoxide, and a slurry of electrically active sodium Beta-alumina polymer is formed according to either of the reactions set forth below:

$$11Al(OR)_{3-y}(OH)_y + Na(OR') \rightarrow \text{sodium Beta-alumina polymer} + \text{alcohols} \quad (2)$$

$$Na(OR)_{1-x}(OH)_x + 11Al(OR')_3 \rightarrow \text{sodium Beta-alumina polymer} + \text{alcohols} \quad (2')$$

where R' is an alkyl group having from 1 to 6 carbon atoms. If either R or R' in these reactions or those shown below contains over 6 carbon atoms, the polymer will be more difficult to dilute and dissolve. It should be understood that partial hydrolysis of $Al(OR')_3$ need not involve exactly one bond, i.e., $Al(OR)_2(OH)$. It can be $Al(OR)_{3-y}$ where y is a number on the average of slightly less than 3 and more than 1/11. If it is 3, all bonds are hydrolyzed; if it is less than 1/11, not all the sodium can react with it. As a practical matter, to allow for loss of Na and/or incomplete reaction, up to 40 mole % excess of Na materials can be used. Reactions (1) and (2) are preferred since Na, which can easily absorb moisture, is added last. This first embodiment is the preferred embodiment of the invention since it is relatively simple and energy conservative.

In a second embodiment of the invention, alcohol solutions of sodium alkoxide and aluminum alkoxide can first be mixed, and then both alkoxides can be hydrolyzed and reacted at the same time.

In these embodiments, an acid peptizing agent, and hydrolyzing water is added after diluting with alcohol. The acid peptizing agent is added somewhere in the process, in an amount effective to prevent agglomeration of polymers. In the first embodiment described above, the peptizing agent is preferably added after the liquid sodium Beta-alumina polymer is formed. In the second embodiment, an acid peptizing agent is preferably added during or after mixing the alcohol solutions of the sodium and aluminum alkoxides. Peptization is preferably allowed to proceed at a temperature of between about 40° C. to about 80° C. Excess water along with solvent and preferably acid can later be added to ensure the completion of the reactions in the formation of the sodium Beta-alumina precursor.

In a third embodiment of the invention, aluminum alkoxide is partially hydrolyzed as in the first embodiment, generally at about 80° C. This partially hydrolyzed alkoxide is then peptized with acid. Sodium alkoxide is then added. Water, or a water-solvent solution, is then added to completely hydrolyze the mixture. If a precipitate begins to form upon complete hydrolysis, additional acid can be added to provide a clear solution.

In a fourth embodiment of the invention it may be desirable to partially hydrolyze both the sodium alkoxide and the aluminum alkoxide as preferably shown in steps (1) and (1') described hereinabove, and then add them together in step (4) as shown below:

$$11Al(OR)_{3-y}(OH)_y + Na(OR_{1-x}(OH)_x \rightarrow \text{sodium Beta-alumina polymer} + \text{alcohols} \quad (4)$$

Here, peptizing agent is added after the precursor is formed.

In the method of this invention, Na and Al are reacted in the sodium-aluminum mixing step, generally in a solvent medium, rather than during a heating step, to form an electrically active polymer. This use of non-crystalline materials in conjunction with the use of a peptizing agent, to form a homogeneous agglomerate-free sol, provides a continuous film, and extremely small grain structures with minute pores upon later heat crystallization. With neutral crystalline materials, peptizing agents would have little or no effect in preventing agglomerations.

After this low temperature polymerization takes place, water is added, preferably diluted in a solvent such as alcohol, in an amount effective to hydrolyze and liberate substantially all of the remaining carbon containing (OR) or (OR') organic groups, by forming alcohols and forming a hydroxide complex. The resulting fluid, Beta-alumina precursor sol comprises polymer chains such as (OH)$_2$=Al-O-Na, (OR)$_2$=Al-O-Na or (OR)(OH)=Al-O-Na.

This sodium Beta-alumina precursor is of a pourable viscosity, generally from about 250 cps to about 500,000 cps at 25° C. It has a stable storage life of at least four to six months in a closed container at 25° C. and can be applied to a substrate by brushing. It can also be applied by low temperature spraying or suitable dipping technique. In all cases, application will preferably be at temperatures of only up to about 35° C. The substrate can be flat, curved, or of a complex configuration, but is usually a closed tube as shown in the drawing. The support may be glass, but will generally comprise a refractory ceramic material that is highly porous and able to resist thermal heat shock and rough handling without fragmentation.

The precursor can be applied on the inside or the outside of the closed ceramic tube or other substrate, to a thickness of from about 0.005 micron to about 30 microns preferably between about 1 micron to about 20 microns for battery applications. Over about 30 microns, the films do not bond easily to supporting substrates and will separate upon high temperature cycling. Under about 0.005 micron, the film's use as a barrier layer begins to suffer.

Upon heating to about 500° C., the sodium Beta-alumina precursor film forms an amorphous transition oxide sodium Beta-alumina precursor material, which tenaciously bonds to the substrate support. When this amorphous film material is heated between 1200° C. to about 1450° C., preferably between 1200° C. to about 1300° C., phase transformation to crystalline, ceramic sodium Beta-alumina takes place:

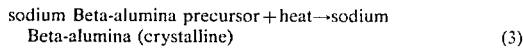

sodium Beta-alumina precursor + heat → sodium Beta-alumina (crystalline)     (3)

Heating below 1200° C. will result in incomplete phase change. Heating over about 1450° C. results in initiation of sodium loss. No sintering i.e. further heating between 1500° to 1800° C. is required.

The sodium Beta-alumina thin film material formed after crystallization heating can be expressed by the generic chemical formula Na$_2$O.xAl$_2$O$_3$. It can include two ceramic types: sodium beta-Al$_2$O$_3$ (wherein x=9 to 11), and sodium beta"-Al$_2$O$_3$ (wherein x=5 to 7). Where x=8, a two-phase system results. The term "sodium Beta-alumina" is herein defined to mean either of these sodium beta or sodium beta" types, their combination or mixture, or other types of sodium containing aluminas. The preferred material, because of its high ionic conductivity, is the sodium beta"-Al$_2$O$_3$ type.

In some instances, it may be desirable to add an oxygen-containing Li, K, or Mg metallic compound, at some point in the process, preferably in the initial mixing of alkoxide with alcohol solvent. This compound is added in an amount effective to increase heat stability of the sodium Beta-alumina. These compounds can comprise up to about 10 wt.%, but generally between about ¼ wt.% to about 3 wt.% of the additive ingredient. A heat stabilizer may be used at high temperatures, because as sodium is lost during crystallization heating the sodium Beta-alumina can revert toward Alpha-alumina (Al$_2$O$_3$). Suitable oxygen-containing metallic heat stabilizers are well known in the art and include alkoxides, oxides and carbonates, such as, for example, LiOCH$_3$, K$_2$CO$_3$, MgO and the like. The term "sodium Beta-alumina" is herein meant to also include such minor amounts of heat stabilizers as may be added in the process.

The sodium Beta-Al$_2$O$_3$ type ceramic has a structure composed of Gamma-alumina-like blocks bridged by layers containing only ¼ as many oxygen anions as are present in the (111) planes of blocks. Monovalent cations lie in tunnels resulting from this oxygen deficiency, and cations in adjacent tunnels form a hexagonal pattern. Between 15% and 30% of the possible Na+ sites are filled. Conduction occurs only in the conductive bridging layers, which are 11.3 Angstrom units apart in sodium beta-Al$_2$O$_3$. The sodium beta"-Al$_2$O$_3$ type ceramic has a structure where the Alpha-alumina blocks are rotated about a three-fold screw axis normal to the bridging layers. This produces rhombohedral symmetry accompanied by an increased distance between conductive bridging layers to 11.6 Angstrom units.

In the method of this invention, utilizing low temperature polymerization, peptization of organometallic sodium and aluminum compounds, and application of the precursor as a sol not containing any substantial amounts of agglomerations or neutral crystalline particulate materials; a mixture of small grains of substantially the same size are formed in the thin film coating after heating the sodium Beta-alumina precursor film between 1200° C. and about 1450° C. Substantially all of the grain dimensions, herein defined as the average distance between the edges of the grains, will range from about 0.1 micron to 0.2 micron at crystallization temperatures of 1200° C., to about 0.85 micron at crystallization temperatures of about 1450° C.

In the method of this invention, no subsequent sintering at 1500° C. to 1800° C. is required, eliminating problems of increasing grain size and porosity. After heating to about 1200° C. the grains have a substantially round particulate structure. After heating to about 1450° C. the grains tend to have a needlelike intermixed structure, indicating some grain growth.

This thin film method produces pores in the electrolyte film with radii of less than about 250 Angstrom units, generally between about 10 to about 70 Angstrom units, providing a film of very low porosity, impervious to liquid molten sodium or sulfur even when the film is less than 30 microns thick. This would prevent molten sodium or sulfur seepage through the electrolyte in sulfur-sodium battery operation. These values may be compared to typical pore sizes of 10,000 to 60,000 Angstrom units observed in solid electrolyte tubes made by standard crystalline powder application sintering techniques. The following examples are illustrative of several of the specific embodiments described hereinabove.

EXAMPLE 1

A highly ion-conductive film was made and bonded to a supporting substrate according to the first and most preferred specific embodiment described heretofore. One hundred and twenty-four grams (0.5 mole) of 99.9% pure aluminum sec-butoxide was dissolved in a beaker containing 1000 grams of ethyl alcohol and 9 grams of distilled water at 25° C., to cause a partial hydrolysis reaction and form a partially hydrolyzed aluminum alkoxide. A precipitate began to form. The mixture was then heated at 50° C. for several hours until the mixture cleared, after which it was cooled to 25° C. Then 10.25 grams (0.125 mole) of 99.9% pure sodium iso-propoxide was added to the beaker at 25° C., to form a viscous, polymerized sodium Beta-alumina slurry.

This mixture provided a 25% excess of sodium, an amount effective to ensure complete formation of crystalline sodium Beta-alumina.

In a separate beaker, 3 grams of acetic acid, as peptizing agent, and 18 grams of water were combined with 1000 grams of ethyl alcohol. This mixture was added to the polymer slurry at 25° C., to hydrolyze any remaining alkoxide groups, to prevent agglomeration in the solution, and to provide a clear, homogeneous, fluid, agglomerate-free sol, containing about 1.2 equivalent $Al_2O_3$ by weight i.e., Al was present in a concentration equivalent to 1.2 wt.% $Al_2O_3$ (½ mole Al sec-butoxide = equiv. of ¼ mole $Al_2O_3$ = equiv. of 25.5 grams of $Al_2O_3$; therefore 25.5/tot. wt. of ingredients = 25.5/2160 = 1.2 equiv. wt. % $Al_2O_3$).

The sol was then poured onto a 2″ diameter pyrex glass evaporation dish at 25° C. The coated glass dish was placed in a resistance furnace until the temperature reached 1200° C., to cause crystallization of the thin film. After the temperature of the coated glass dish had been maintained at 1200° C. for 1 hour, it was removed from the furnace and cooled. The coated film had a thickness of about 25 microns, was continuous, and was intimately bonded to the glass dish support plate.

Part of the film was then carefully peeled from the glass evaporation dish, ground up, pulverized, and subjected to an X-ray diffraction analysis which showed substantially 100% pure ion-conductive sodium Beta-alumina. The liquid could be further heat stabilized with Li, K, or Mg added as an effective amount of oxide, carbonate, or alkoxide in the initial alcohol dissolution stage.

BET-gas adsorption analysis showed that the sodium Beta-alumina film formed at 1200° C. had pores with radii less than 70 Angstrom units, which would not allow penetration of non-ionic sodium. To verify that liquid sodium would not be transmitted through the thin porous films reported here, samples were exposed to liquid sodium at 300° C. in an argon atmosphere for 1 hour. No visible evidence of liquid sodium permeation through the film was observed; the liquid sodium droplet remained beaded, appearing not to wet the sample surface.

EXAMPLE 2

A highly ion-conductive film was made and bonded to a supporting substrate according to the second specific embodiment described heretofore. A solution of 1 weight percent Na was prepared by dissolving 0.82 gram of 99.9% pure sodium iso-propoxide in 99 grams of propyl alcohol at 50° C. Then, 12.3 grams of 99.9% pure aluminum sec.butoxide was dissolved in 100 grams of propyl alcohol at 25° C. An Al:Na ratio of 5:1 was achieved by mixing all of the Al solution with all of the Na solution at 25° C. In a separate beaker 0.9 gram of water (1 mole/mole Al) was diluted in 50 grams of ethyl alcohol, and 0.32 gram of nitric acid (about 0.1 mole/mole $H_2O$) was added. The contents of the beaker containing diluted water and acid peptizing agent was added to the Al-Na solution, with heating for 1 hour at 50° C. to clear the mixture. This mixing caused partial hydrolysis and reaction of the Al and Na compounds.

To complete hydrolysis, 2 grams of $H_2O$ diluted in 30 grams of ethanol was added to the Al-Na mixture along with 2 grams of 70% acetic acid at 50° C. to completely clear the mixture and form a viscous, polymerized sodium Beta-alumina precursor sol containing about 1 percent equivalent $Al_2O_3$ by weight.

The sol was then poured onto a 2″ diameter pyrex glass evaporation dish at 25° C. The coated glass dish was placed in a resistance furnace until the temperature reached 1200° C. to cause crystallization of the thin film. After the temperature of the coated glass dish had been maintained at 1200° C. for 1 hour, it was removed from the furnace and cooled. The coated film was continuous, had a thickness of about 25 microns, and was intimately bonded to the glass dish support.

Part of the film was then carefully peeled from the glass evaporation dish, ground up, pulverized, and subjected to an X-ray diffraction analysis which showed substantially 100% pure ion-conductive sodium Beta-alumina. BET-gas adsorption analysis showed that the sodium Beta-alumina film formed at 1200° C. had pores with radii less than 70 Angstrom units, which did not allow any observable penetration of liquid sodium at 300° C.

EXAMPLE 3

A highly ion-conductive film was made and bonded to a supporting substrate according to the third embodiment described heretofore. To 0.64 gram of 99.9% pure aluminum sec-butoxide 150 grams of $H_2O$ was added at about 75° C. to partially hydrolyze the Al compound even though excess water was used. Then 0.23 gram of nitric acid (0.07 mole/mole Al) was added at 80° C. to peptize the Al monohydride, causing a break-up of AlOOH particles and providing a stable sol that was cooled to 25° C. Dry 99.9% pure sodium iso-propoxide, 0.82 gram, was added to the sol with stirring at 25° C. causing the mixture to thicken. The mixture was thinned by the addition of 50 grams of $H_2O$ to completely hydrolyze the reacted Al and Na compounds. Particulate formation was controlled by finally adding 6 grams of nitric acid dropurse under continued stirring until a sudden thinning and clearing was evident, providing a viscous polymerized sodium Beta-alumina precursor sol containing about 1.3 percent equivalent $Al_2O_3$ by weight.

The liquid was then brushed onto a 2″ diameter pyrex glass evaporation dish at 25° C. The coated glass dish was placed in a resistance furnace until the temperature reached 1200° C. to cause crystallization of the thin film. After the temperature of the coated glass dish had been maintained at 1200° C. for 1 hour, it was removed from the furnace and cooled. The coated film was continuous, had a thickness of about 25 microns, and was intimately bonded to the glass dish support.

Part of the film was then carefully peeled from the glass evaporation dish, ground up, pulverized, and subjected to an X-ray diffraction analysis which showed substantially 100% pure ion-conductive sodium Beta-alumina. BET-gas adsorption analysis showed that the sodium Beta-alumina film formed at 1200° C. had pores with radii less than 70 Angstrom units, which did not allow any observable penetration of liquid sodium at 300° C.

As shown above, this method allows thin film formation of a low porosity, continuous, thin, sodium ion-conductive, sodium Beta-alumina on a support. Other supports, such as alpha-alumina ceramic, mullite ceramic or zirconium oxide ceramic, as well as other Al and Na alkoxides, and other acidic peptizing materials could be used. This film could be easily formed on ceramic supports for use as supported, thin film solid electrolyte barriers in sodium-sulfur batteries.

We claim:

1. A method of making a highly ion-conductive, supported sodium-Beta alumina thin electrolyte film, which comprises the steps of:
   (A) forming a fluid, sodium Beta-alumina precursor sol having an Al concentration equivalent to between about 0.5 and about 2.5 weight percent $Al_2O_3$, by the steps comprising, first reacting Na(OR) and Al(OR)$_3$ alkoxide compounds, where R is an alkyl group containing from 1 to 6 carbon atoms, and then peptizing and completely hydrolyzing the reactants; in a manner such that a Na compound is reacted with an Al compound to form a chemical bond between Na and Al through oxygen to form a slurry of non-crystalline, electrically surface active polymers containing Na, Al, OR, and OH groups before complete hydrolysis, and where a peptizing acid is added to the reactants and adsorbed on the polymer surface at some point in sol formation after alkoxide reaction to provide a non-crystalline, homogeneous, agglomerate-free, fluid sol;
   (B) applying the fluid, non-crystalline precursor sol as a film to a substrate; and finally
   (C) heating the precursor film at between 1200° C. and about 1450° C., to cause a phase change and formation of a uniform, low porosity, solid material comprising crystalline sodium Beta-alumina in film form firmly bonded to the substrate, where the solid film has pores with radii of up to about 250 Angstrom units, and where, in step (A) the Na compound and the Al compound are added in an amount effective to provide a mole ratio of Na:Al of from 1:5 to 11 in the final crystalline film formed after heating in step (C).

2. The method of claim 1, where the solid film is between about 0.005 micron to about 30 microns thick and is effective to prevent molten sodium penetration.

3. The method of claim 1, where the precursor is applied to the substrate at temperatures of up to about 35° C. and the substrate is a refractory ceramic material.

4. The method of claim 1, where the Na(OR) and Al(OR)$_3$ components are peptized by an acid selected from the group consisting of nitric acid, acetic acid, hydrochloric acid, formic acid, trichloroacetic acid and perchloric acid.

5. The method of claim 1, wherein a metallic compound selected from the group consisting of K, Li and Mg oxygen containing compounds is added in step (A) in an amount effective to increase the heat stability of the crystalline sodium Beta-alumina, and the crystalline sodium Beta-alumina ceramic material formed in step (C) has a grain structure with substantially all of the grain dimensions between about 0.1 micron and about 0.85 micron.

6. The method of claim 1, wherein the crystalline sodium Beta-alumina ceramic formed in step (C) is selected from the group consisting of sodium Beta-alumina ceramics having the formula $Na_2O \cdot xAl_2O_3$ where x can vary from 5 to 7, sodium Beta-alumina ceramics having the formula $Na_2O \cdot xAl_2O_3$ where x can vary from 9 to 11, and mixtures thereof.

7. The method of claim 1, wherein the Al(OR)$_3$ compound is aluminum sec-butoxide and the Na(OR) is sodium iso-propoxide.

8. The method of claim 1, where one of the Na(OR) and Al(OR)$_3$ alkoxide compounds is (1) first partially hydrolyzed by water, and then (2) reacted with an effective amount of the other alkoxide compound to form an electrically surface active polymer, and then (3) the polymer is completely hydrolyzed by a water-alcohol solution and peptized with an acid electrolyte, to form an agglomerate-free, sodium Beta-alumina precursor sol.

9. The method of claim 1, where effective amounts of Na(OR) and Al(OR)$_3$ are (1) first mixed and reacted, and then (2) completely hydrolyzed by a water-alcohol solution and peptized with an acid electrolyte, to form an agglomerate-free sodium Beta-alumina precursor sol.

10. The method of claim 1, where Al(OR)$_3$ alkoxide is (1) first partially hydrolyzed by water, and then (2) peptized with an acid electrolyte, and then (3) reacted with an effective amount of Na(OR) alkoxide and then (4) completely hydrolyzed by water, to form an agglomerate-free sodium Beta-alumina precursor sol.

11. The method of claim 1, where (1) Na(OR) is partially hydrolyzed by water, and (2) Al(OR)$_3$ is partially hydrolyzed by water, and then (3) the partially hydrolyzed Na(OR) and Al(OR)$_3$ are mixed and reacted to form an electrically surface active polymer, and then (4) the polymer is completely hydrolyzed by a water-alcohol solution and peptized with an acid electrolyte, to form an agglomerate-free, sodium Beta-alumina precursor sol.

12. A method of making a highly ion-conductive, supported sodium-Beta alumina thin electrolyte film, which comprises the steps of:
(A) forming a fluid, sodium Beta-alumina precursor sol having an Al concentration equivalent to between about 0.5 and about 2.5 weight percent $Al_2O_3$, by controlled hydrolyzing and acid peptizing Na(OR) and Al(OR)$_3$ alkoxide compounds, where R is an alkyl group containing from 1 to 6 carbon atoms, by:
   (1) first partially hydrolyzing one of the alkoxide compounds with water, and then
   (2) reacting the first partially hydrolyzed alkoxide with an effective amount of the other alkoxide compound so that a Na compound is reacted with an Al compound to form a chemical bond between Na and Al through oxygen to form a slurry of non-crystalline, electrically surface active polymers containing Na, Al, OR, and OH groups, and then
   (3) completely hydrolyzing the polymer with a water-alcohol solution and peptizing it with an acid electrolyte where the peptizing acid is adsorbed on the polymer surface to provide a non-crystalline, homogeneous, agglomerate-free, fluid sol,
(B) applying the fluid, non-crystalline precursor sol as a film to a refractory ceramic substrate, and finally
(C) heating the precursor film at between 1200° C. and about 1450° C., to cause a phase change and formation of a uniform, low porosity, solid material comprising crystalline sodium Beta-alumina in film form firmly bonded to the substrate, where the solid film has pores with radii up to about 250 Angstrom units, and where, in step (A) the Na compound and the Al compound are added in an amount effective to provide a mole ratio of Na:Al of from 1:5 to 11 in the final crystalline film formed after heating in step (C).

13. The method of claim 12, where the solid film is between about 0.005 micron to about 30 microns thick and effective to prevent molten sodium penetration.

* * * * *